Sept. 29, 1931.　　　C. C. WHITTAKER　　　1,824,855
PROTECTIVE MEANS FOR RAILWAY VEHICLE MOTORS
Filed May 17, 1928　　　4 Sheets-Sheet 1
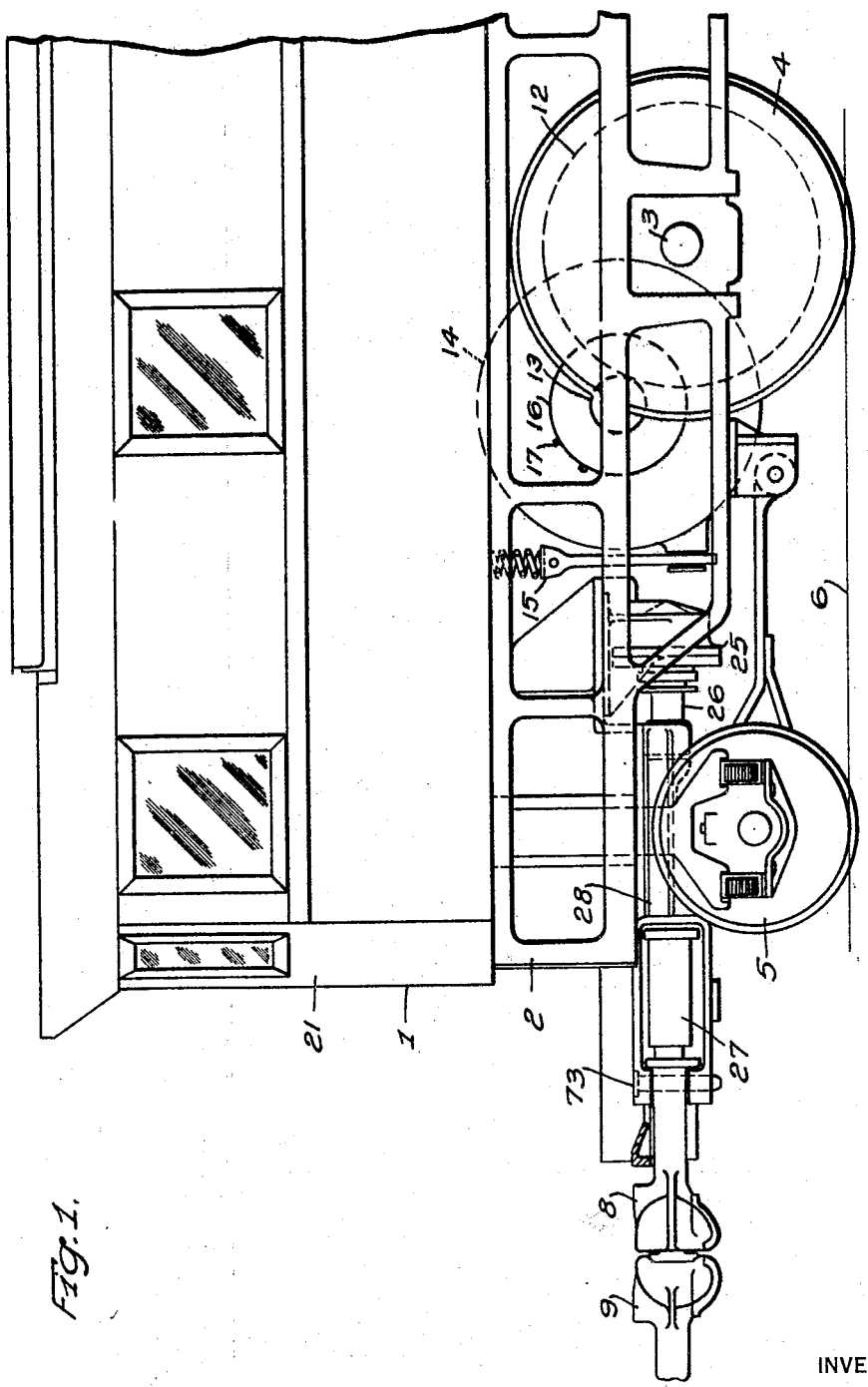
INVENTOR
Charles C. Whittaker.
BY
Wesley G. Carr
ATTORNEY Sept. 29, 1931.  C. C. WHITTAKER  1,824,855
PROTECTIVE MEANS FOR RAILWAY VEHICLE MOTORS
Filed May 17, 1928  4 Sheets-Sheet 2
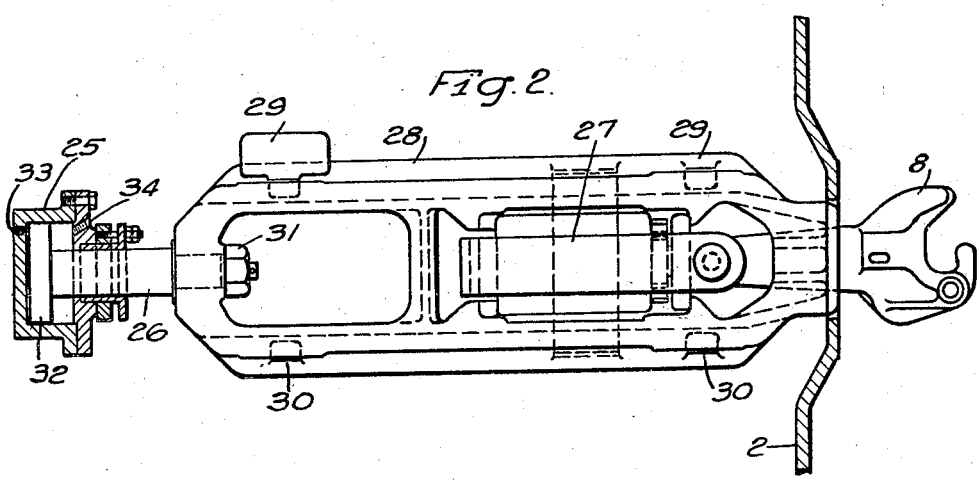
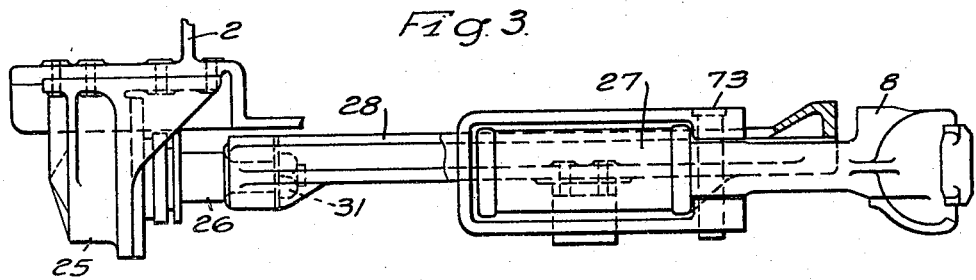
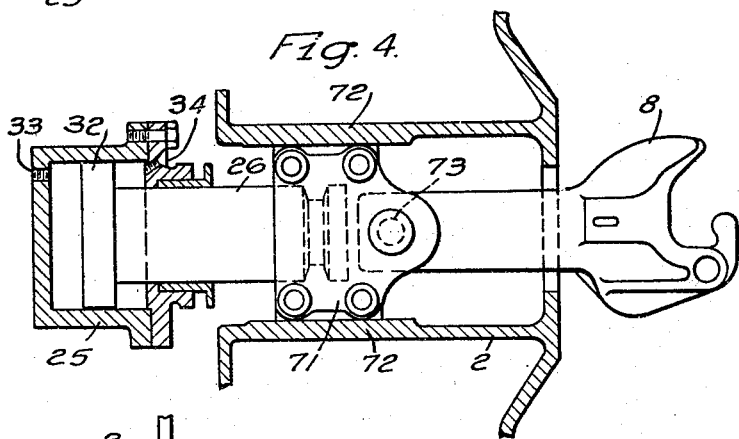
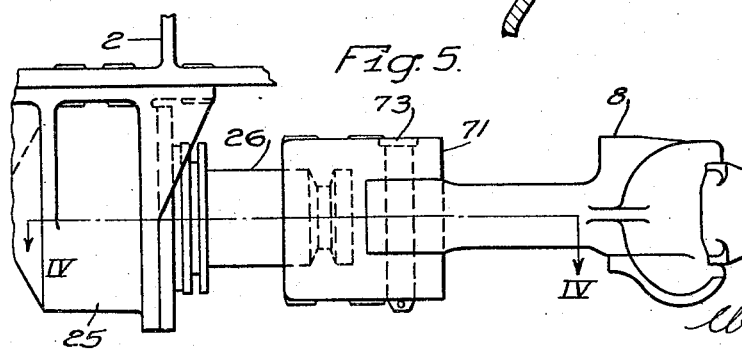
INVENTOR
Charles C. Whittaker.
BY
ATTORNEY Sept. 29, 1931. C. C. WHITTAKER 1,824,855
PROTECTIVE MEANS FOR RAILWAY VEHICLE MOTORS
Filed May 17, 1928 4 Sheets-Sheet 3

INVENTOR
Charles C. Whittaker.
BY
Chesley L. Carr
ATTORNEY

Sept. 29, 1931. C. C. WHITTAKER 1,824,855
PROTECTIVE MEANS FOR RAILWAY VEHICLE MOTORS
Filed May 17, 1928 4 Sheets-Sheet 4

INVENTOR
Charles C. Whittaker.
BY
ATTORNEY

Patented Sept. 29, 1931

1,824,855

UNITED STATES PATENT OFFICE

CHARLES C. WHITTAKER, OF PITTSBURGH, PENNSYLVANIA, ASSIGNOR TO WESTINGHOUSE ELECTRIC & MANUFACTURING COMPANY, A CORPORATION OF PENNSYLVANIA

PROTECTIVE MEANS FOR RAILWAY VEHICLE MOTORS

Application filed May 17, 1928. Serial No. 278,405.

My invention relates generally to railway vehicles and particularly to protective means for the traction apparatus provided for propelling railway vehicles.

Railway vehicles, such as locomotives provided with direct-current motors or single-phase commutating motors, may be damaged during the starting period by applying a heavy current to the starting motors, if the train to which the locomotive is attached does not start immediately.

In starting trains requiring two or more locomotives, power may be applied to one locomotive and it may exert its full tractive effort before current is applied to the motors of the other locomotives, and, under such conditions, the entire starting current will pass through a limited number of commutator bars and coils in each of the driving motors of the first energized locomotive until the other locomotives take up their share of the load.

The object of the invention, generally stated, is to provide for limiting the time during which current may flow continuously through any group of commutator bars to prevent excessive heating.

Another object of the invention is to provide for causing relative movement between the brushes and commutator cylinder of a propelling motor of an electrical locomotive, during the process of starting a train, to prevent excessive heating of any of the commutator bars.

A further object of the invention is to accomplish relative motion between the commutator cylinder and the brushes of the driving motor of a locomotive by providing means for oscillating the locomotive relative to the train to which it may be attached.

Another object of the invention is to provide a draw-bar mechanism that is disposed to be oscillated in a longitudinal direction relative to the locomotive, whereby the locomotive may be moved relative to the train to which it is attached.

It will be apparent, upon studying the following description, that these and other objects of the invention may be attained by means of the apparatus shown in connection with an electrical locomotive in the accompanying drawings; in which, Figure 1 is a view, in side elevation, of one end of a locomotive equipped with an oscillating draw-bar mechanism that embodies the invention;

Fig. 2 is a plan view, partially in section, of the oscillating draw-bar mechanism embodied in the locomotive shown in Fig. 1;

Fig. 3 is a view, in side elevation, of the draw-bar mechanism shown in Fig. 2;

Fig. 4 is a plan view, partially in section, of a modified form of draw-bar mechanism taken along the line IV—IV of Fig. 5;

Fig. 5 is a view, in side elevation, of the modified draw-bar mechanism shown in Fig. 4;

Figure 6:
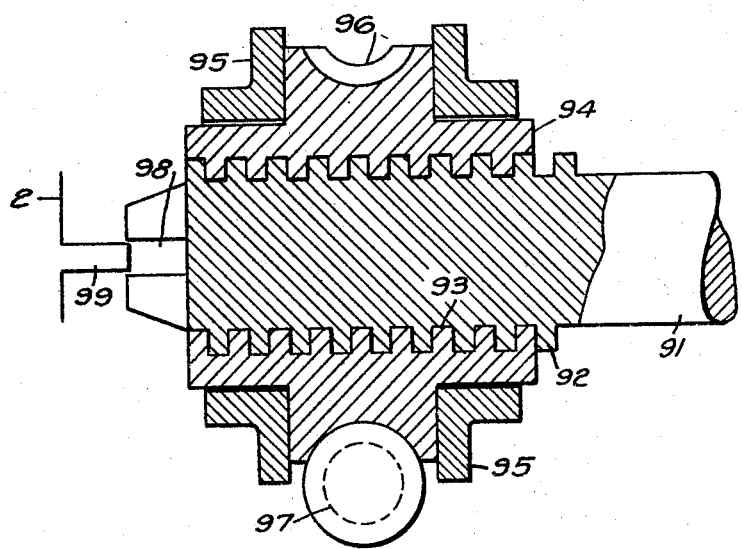
Fig. 6 is a view, in longitudinal section, of another modification of the invention.

Referring to the drawings, Fig. 1 shows a standard electrical locomotive 1 that comprises a frame portion 2 in which is journalled a driving axle 3 having wheels 4, which, together with a guiding truck 5 serve to support the locomotive 1 upon rails 6 in the usual manner. At the end of the frame portion 2 is secured a standard draw-bar and coupling mechanism 8 that is disposed to connect the locomotive to a train of cars (not shown) that may be represented by a draw-bar and coupling device 9.

To provide means for driving the locomotive, the driving axle 3 has attached to it a gear wheel 12 that meshes with a pinion 13 mounted on a driving motor 14. The driving motor 14 is suspended from the frame member 2 by means of a spring suspension link 15 and is provided with the usual commutator cylinder 16 and cooperating brushes 17. The frame member 2 further serves to support a cab or body portion 21 that encloses the driving motor 14 and other electrical equipment, as well as provides accommodations for the locomotive operator.

Under certain starting conditions, the electrical locomotive 1 may exert its full starting tractive effort for some time before the train, which is represented in Fig. 1 by the draw-bar 9, starts to move. It will be evident that, if some means is provided for moving the commutator cylinder 16 relative to the brushes 17 during the starting period in such manner that the current is caused to flow through successive coils progressively, danger of excessively heating portions of the motor rotor will be avoided. In the locomotive shown in Fig. 1, the desired relative movement between the commutator cylinder and the brushes is accomplished by moving the entire locomotive 1 backward and forward along the track 6 relative to the train 9 a sufficient distance to cause the commutator cylinder 16 to rock back and forth relative to the brushes 17 in such manner that each of the bars of the commutator cylinder 16 is subjected to the starting current. In the specific example, illustrated, the driving wheel 4 is 62 inches in diameter, the driving gear wheel 12 is 52 inches in diameter, the motor pinion 13 is 10½ inches in diameter and the commutator cylinder 16 is 26¾ inches in diameter. The motor 14 is provided with twelve of the brushes 17 and, therefore, the minimum distance which the locomotive must be moved in order that all of the commutator-cylinder surfaces may be brought into engagement with the brushes 17 is equal to:

$$\frac{26.75\pi}{12} \times \frac{10.5 \times 62}{26.75 \times 52} = 3.27 \text{ inches}$$

It is, therefore, apparent that the heating effect of the starting current may be distributed throughout the rotor of the driving motor in a manner that simulates the conditions obtained when the locomotive is in normal operation along the track by simply moving the locomotive backward and forward a distance of approximately 3½ inches. This comparatively small movement of the locomotive is accomplished, in the preferred form of the invention, by means of a hydraulic cylinder 25 that is mounted on the frame member 2 and is provided with a piston rod 26 which is connected to the coupling mechanism 8. As more clearly shown in Figs. 2 and 3, the coupling is secured to a friction-draft-gear mechanism 27 of standard design that is ordinarily securely attached to a locomotive frame. As shown in Fig. 2, the draft gear 27 and the coupling 8, as utilized in accordance with the invention, are mounted in a yoke 28 that is disposed to slide longitudinally relative to the locomotive frame 2 between the guide members 29 and 30. The end of the yoke 28 that is farthest from the drawbar 8 is attached to the piston rod 26 by means of a nut 31. The piston rod 26 is provided with a piston 32 that is disposed to be moved within the cylinder 25 by means of fluid pressure that may be applied through the inlet openings 33 and 34.

Figure 7:
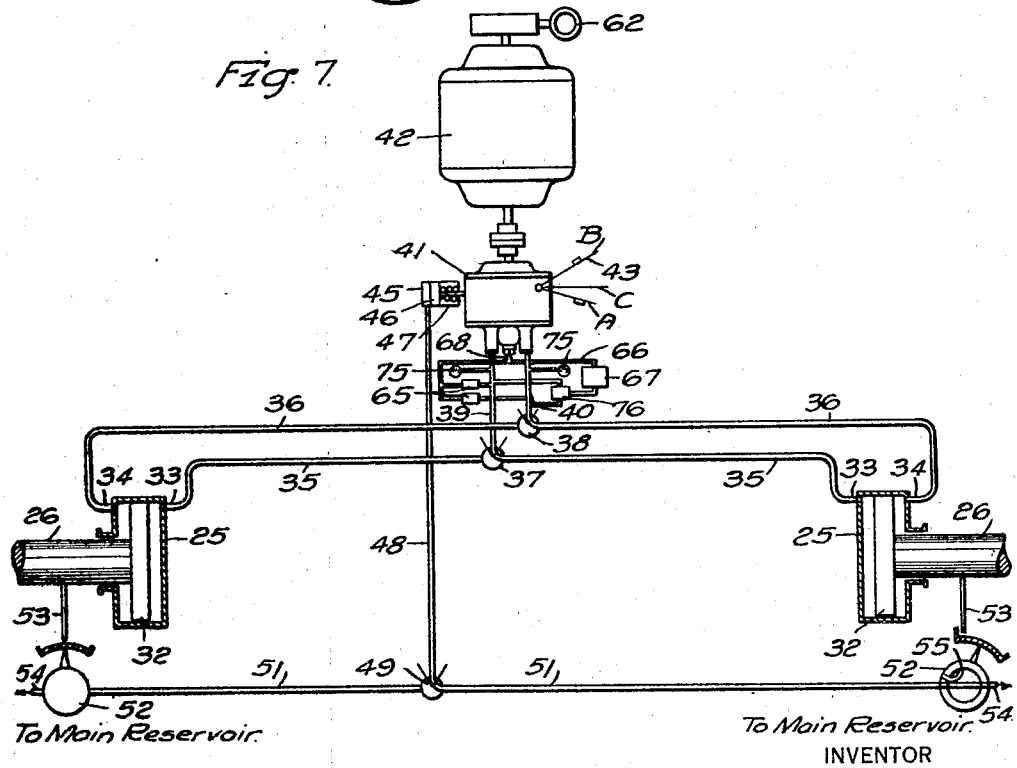
Fig. 7 is a schematic diagram of the hydraulic system used in connection with the draw-bar mechanism shown in Figs. 1 to 5.

In Fig. 7 are shown diagrammatically two cylinders 25, one for each end of a locomotive, that are each provided with a piston 32 and a piston rod 26, as shown in Figs. 2 and 3. In order that fluid pressure may be applied, pipes 35 and 36 are connected to the openings 33 and 34, respectively, in each of the cylinders 25. These pipes are connected, by means of three-way valves 37 and 38 and pipes 39 and 40, to a source of fluid pressure, such as a pump 41. The pump 41 is of the rotary hydraulic type that is disposed to be operated continuously in one direction by means of a driving motor 42 and to supply fluid pressure to either the pipe 39 or the pipe 40. The flow of fluid is governed, both as to direction and amount, by the position of a lever 43 that may be actuated manually or by means of a device, such as an air cylinder 45, that is provided with a piston 46 having a spring return mechanism 47. The air cylinder 45 is connected, by means of a pipe 48, to a three-way valve 49 that is disposed to connect the pipe 48 to either one of two pipes 51 leading to reverse valves 52 which are disposed to cooperate with reversing arms 53 on each of the piston rods 26.

As shown at the right-hand side of Fig. 7, the valve 52 is utilized to connect the pipe 51 to a source of fluid pressure, such as the usual compressed-air lines utilized on locomotives that may be represented by a pipe 54. The connections between the piston 46 and the lever 43 are such that, when pressure is applied to the piston 46, the lever 43 will be moved to a position A in opposition to the force exerted by the spring 47.

If the train to be started is connected to the right-hand end of the locomotive, that is represented diagrammatically in Fig. 7 by the right-hand cylinder 25 and piston rod 26, the three-way valves 37, 38 and 49 are turned to connect the pipes 39, 40 and 48 to the pipes 35, 36 and 51, respectively, leading to the oscillator mechanism at the right-hand end of the locomotive.

Figure 12:
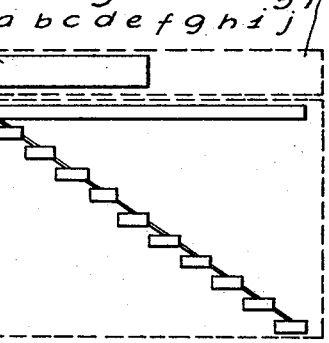
Fig. 12 is a diagram of the locomotive control drum and the electrical circuit utilized for controlling the oscillating mechanism.

In order that the oscillator mechanism may function as soon as current is applied to the driving motor 14, a control segment 56, Fig. 12, for controlling the motor 42 is incorporated with a locomotive-starting drum 57 that is utilized in a well known manner for starting the driving motor 14. In the particular structure shown in Fig. 12, the full starting tractive effort of the locomotive is developed when the controller drum 57 is turned to position e, and an overload circuit breaker (not shown) will be opened if the controller is moved to position f before the train starts.

The control segment 56 is, therefore, so dimensioned that it will close a circuit 58 extending from a control battery 59 through a contactor 60 while the controller 57 is in any one of the first five positions a, b, c, d or e. The contactor 60 is disposed to close a circuit 61 that connects the motor 42 to the battery 59 in series with a magnetic-brake mechanism 62. Consequently, when the starting current is first applied to the motor 14 by moving the controller drum 57 to position "a", the circuit 58 is closed by means of the segment 56, thereby energizing the contactor 60 which closes the circuit 61. When the circuit 61 is closed, the magnetic brake 62 is released, and the motor 42 is energized to drive the pump 41. As long as the controller 57 remains on any one of the first five notches, the motor 42 will continue to run and operate the pump 41 continuously in one direction.

As hereinbefore explained, the pump 41 will supply fluid pressure to either the pipe 39 or the pipe 40 and, starting from the position shown in Fig. 7, pressure will first be applied through the pipes 40 and 36 to the right-hand face of the piston 32. The piston 32 will, consequently, be caused to move slowly to the left relative to the cylinder 25. Inasmuch as the cylinder 25 is rigidly secured to the locomotive 1, this motion will cause the locomotive to be drawn towards the train to which it is attached. When the piston 32 approaches the end of its stroke, the reversing arm 53 that is mounted on the piston rod 26 will engage the reversing valve 52 and turn it in such manner that the pipe 51 will be disconnected from the source of fluid pressure, represented by the pipe 54, and will be connected to the atmosphere by means of the passage 55. This will allow the air to escape from the air cylinder 45 and permit the piston 46 to return to the head of the cylinder 45 under the action of the spring 47.

The connections between the piston 46 and the lever 43 are such that movement of the piston to the head of the cylinder 45 causes the lever 43 to move from position A to position B. When the lever 43 is moved to position B, the direction of the flow of fluid from the pump 41 is changed, and pressure is applied through the pipes 39 and 35 to the left-hand face of the piston 32. It may be further observed that, when the lever 43 is in position B, it is at a greater distance from the center position C than it is when in position A. This is to provide for a greater flow of fluid to the left-hand side of the piston 32, inasmuch as the piston surface is not the same on each side because of the surface occupied by the piston rod 26 on the right-hand side.

When the lever 43 is in position B, the cylinder 25 and the locomotive 1 upon which it is mounted will be caused to move to the left relative to the piston 32 which remains in substantially constant relation to the train which may be attached to the locomotive. Of course, in normal practice, the tractive effort being exerted by the locomotive will tend to move it to the left and, therefore, the pressure in the pipe 36 will be greater than the pressure in the pipe 35. Under these conditions, the pump 41 will operate as a motor and drive the motor 42 as a generator. In order that the motor 42 may regenerate in this manner, it is desirable that it be operated by current from the battery 59 that is normally utilized for auxiliary apparatus in the locomotive. As shown in Fig. 12, the field 63 of the motor 42 is connected, in shunt to the armature 64, across the terminals of the battery 59 in such manner that, when it is being driven as a generator, it will deliver energy to the battery 59. By means of this connection, the pump 41 is restrained to operate at a substantially constant speed in one direction, regardless of whether it is acting as a pump furnishing fluid pressure or as a motor operated by fluid pressure exerted by the piston 32.

After the train has started, the controller drum 57 may be moved to any of the operating positions f, g, h, i or j that may be desirable for normal operation. When the controller 57 is in any of these positions, the controller segment 56 will be disengaged from the circuit 58, thereby deenergizing the contactor 60 which will, in turn, stop the motor 42 and deenergize the magnetic brake 62. The brake 62 will then be applied to hold the motor 42 and the pump 41 stationary. When the pump 41 is held stationary, is serves essentially as a valve to prevent communication between the pipe lines 39 and 40, thereby preventing the passage of fluid from one side of the piston 32 to the other side and serving to hold the piston in a substantially fixed position. Relief valves 65 are provided on each of the pipes 39 and 40 and are connected by means of a pipe 66 to an overflow reservoir 67 in such manner that, if excessive pressure is developed in the pipes 35 and 36, it may be relieved by permitting fluid to escape, through the valves 65 and the pipe 66, to the reservoir 67.

A further connection 68 is made between the pipe 66 and the pump 41 in such manner that any fluid that may leak through the pump will also be conducted to the reservoir 67. The relief valves 65 further function in connection with the cylinder 25 and piston 32 as a hydraulic buffing mechanism. Under normal operating conditions, when the locomotive is pulling a load, the piston 32 will be drawn to the end of the cylinder 25 nearest the end of the locomotive, inasmuch as there is always a slight leakage of fluid past the piston 32 and through the pump 41. If then, the locomotive is uncoupled from the train and is later recoupled to a train by backing into it in the usual manner, the force of the coupling blow will develop excessive pressure in the pipe line 35 and 39. As hereinbefore explained, the pressure will be relieved through one of the valves 65, thereby cushioning the blow and relieving the locomotive frame 2 and other parts from excessive strains.

Inasmuch as the hydraulic system takes the place of a friction-draft gear to a large extent, the draw-bar mechanism of the locomotive may be constructed as shown in Figs. 4 and 5. In these views, the coupling 8 is shown directly connected to the piston rod 26 by means of a cross head or guide member 71 that is disposed to slide between guides 72 that are supported upon the locomotive frame 2. A pivotal connection 73 is provided between the draw-bar 8 and the cross head 71 to permit the coupling to swing laterally relative to the locomotive frame. Inasmuch as all railway cars are provided with friction-draft-gear mechanism, such draft gear is not absolutely necessary on a locomotive for successful operation and, therefore, a locomotive provided with the hydraulic oscillating mechanism embodying this invention, which, in itself, serves as a buffing mechanism, may well dispense with the usual friction-draft gear.

As shown in Fig. 7, the pipe lines 39 and 40 are each provided with pressure gauges 75 that may be utilized to indicate the pressure in the pipe line in the usual manner or may be calibrated to indicate directly the draw-bar pull that is being exerted by the locomotive, inasmuch as the draw-bar pull is obviously in direct proportion to the pressure in either the pipe line 39 or the pipe 40.

Figure 10:
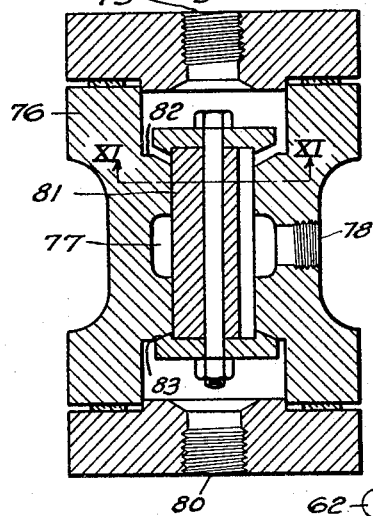
Fig. 10 is a plan view, in cross section, of a valve mechanism utilized in connection with the hydraulic system.
Figure 11:
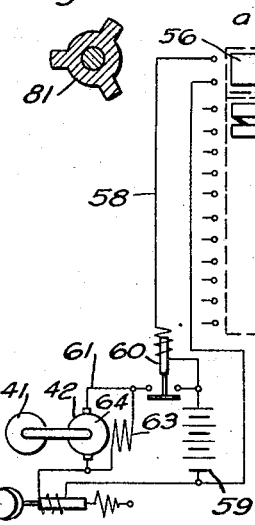
Fig. 11 is a view, in cross section, of a portion of the valve mechanism, taken along the line XI—XI of Fig. 10.

To provide means for returning fluid from the reservoir 67 to the hydraulic system, a make-up valve mechanism 76 is connected to each of the pipe lines 39 and 40 and to the reservoir 67. As shown in Fig. 10, the make-up valve comprises a horizontally disposed valve chamber 77 having an inlet opening 78 near its center that is connected directly to the reservoir 67. Outlet openings 79 and 80 are provided at the ends of the chamber 77 and are connected to the pipe lines 39 and 40, respectively. A slidable valve member 81 is provided within the chamber 77. When pressure is exerted by the pump 41 through the pipe line 40, the valve member 81 is forced to the position shown in Fig. 10, thereby closing a passageway 83 between the pipe line 40 and the reservoir 67 and opening a passageway 82 between the reservoir 67 and the pipe line 39. Inasmuch as suction is exerted upon the pipe line 39 by the pump 41, fluid may be drawn from the reservoir 67 through the inlet opening 78, into the pipe line 39 to make up for any losses that may have occurred through leakage or through the relief valves 65. When pressure is being exerted by the pump upon the pipe line 39, it is obvious that the valve member 81 will be moved downwardly, as seen in Fig. 10, thereby opening the passageway 83 and closing the passageway 82 to connect the pipe line 40 to the reservoir 67.

In order to utilize the oscillating mechanism at the left-hand end of the locomotive, as seen in Fig. 7, it is simply necessary for the operator to turn the valves 37, 38 and 49 to disconnect the cylinder 25 and the reversing mechanism 52 at the right-hand end of the locomotive from the pump 41 and its control mechanism and to connect the left-hand cylinder 25 and reversing valve 52 in their stead.

Figure 8:
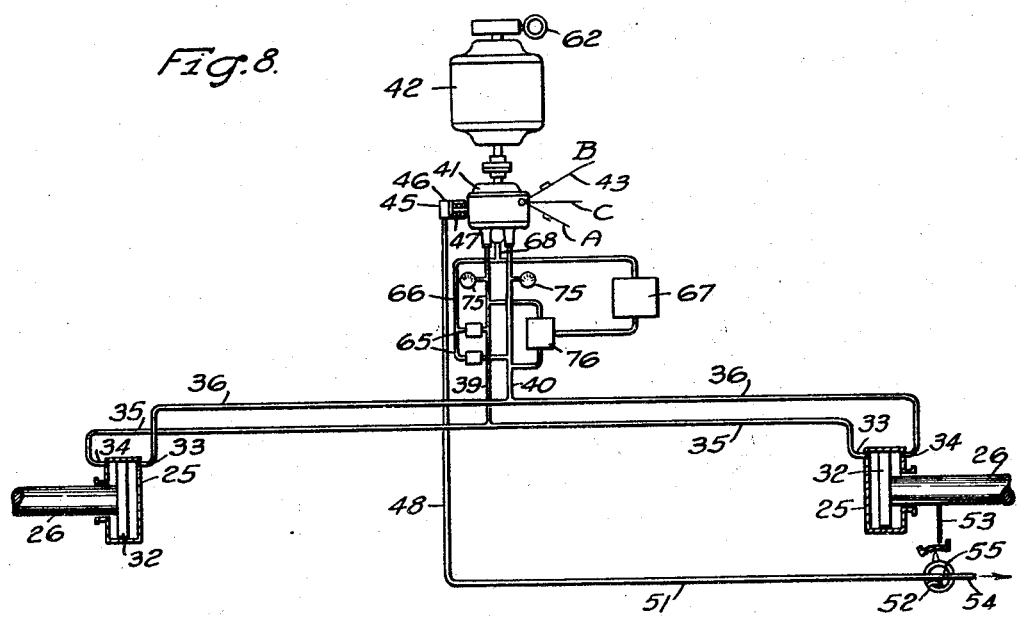
Fig. 8 is a schematic diagram of a hydraulic oscillating system that is disposed to operate the draw-bar mechanisms at either end of a locomotive simultaneously.
Figure 9:
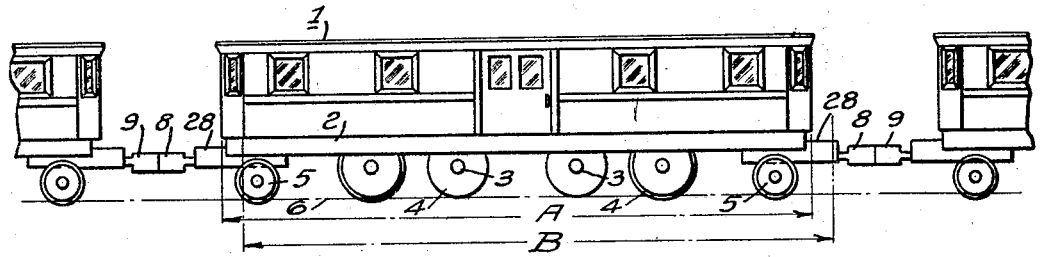
Fig. 9 is a view, in side elevation, of an electrical locomotive equipped with oscillating devices embodying the invention and positioned within a train.

If it is desired to operate a locomotive within a train, as shown in Fig. 9, that is, with cars coupled at each end of the locomotive, the hydraulic system may be connected as shown in Fig. 8 to provide means for actuating the oscillating mechanisms at each end of the locomotive simultaneously. As shown in Fig. 8, the pipe lines 40 and 36 are directly connected to exert pressure upon the right-hand face of each of the pistons 32 and the pipe lines 39 and 35 are connected to exert pressure upon the left-hand face of each of the pistons. It will, therefore, be obvious that, when pressure is applied by the pump 41 to the pipe line 40, the locomotive 1 will be moved to the right with respect to the train 9 from position A to position B, as shown in Fig. 9.

In a modified form of the invention, the oscillation of the draw-bar mechanism may be accomplished by mechanical means, such as shown in Fig. 6. In this view is shown a shaft 91 that may be connected to the draw-bar mechanism in a manner similar to the connection employed between the piston rod 26 and the coupling 8. To provide means for moving the shaft 91 relative to the locomotive frame 2, the external surface of the shaft is provided with threads 92 that engage internal threads 93 in a nut 94. The nut 94 is journalled in the frame 2 between guide members 95 and is provided, on its external surface, with worm threads 96 that engage a worm 97 for rotating the nut. In order to prevent the shaft 91 from turning with the nut 94, a key-way 98 is provided at the end thereof for engaging a key 99 that is secured to the locomotive frame 2. It is obvious that a motor may be connected to the worm 97 for the purpose of actuating the mechanical oscillating device, and a standard limit switch reversing mechanism may be applied to the shaft 91 for the purpose of governing the direction of rotation of the motor and thereby controlling the motion of the draw-bar mechanism.

From the foregoing discussion and description of the apparatus, it may be seen that the invention provides means for moving a locomotive relative to a stationary train to which it may be attached in such manner that the rotors of the driving motors are caused to rock back and forth slowly, thereby distributing the heating effect of the starting current throughout all of the commutator bars and the coils of the motor.

Although I have described specific embodiments of the invention, it will be obvious to those skilled in the art that various modifications may be made in the particular mechanism for moving the locomotive relative to the train without departing from the spirit and scope of the invention as defined in the appended claims.

I claim as my invention:

1. In an electrical locomotive, in combination, a draw-bar and means for oscillating the locomotive relative to the draw-bar.

2. In an electrical locomotive, in combination, a driving motor having a commutator cylinder and brushes, a draw-bar, and means for moving the commutator cylinder relative to the brushes while the draw-bar is stationary relative to the track upon which the locomotive may be operating.

3. In an electric locomotive, the combination with wheel axles and a driving motor having a commutator cylinder and brushes, of means for moving the locomotive back and forth while the train to which it is attached is at rest and while the motor is energized to exert tractive effort to cause the commutator cylinder to oscillate relative to the brushes, thereby distributing the heating effect of the energizing current throughout the commutator cylinder.

4. An oscillating system for moving a locomotive relative to the train to which it is attached that comprises a hydraulic cylinder securely mounted in the locomotive, a piston in the cylinder, a draw-bar mechanism secured to the piston, a pump connected to the cylinder at each side of the piston, a motor for driving the pump and means for controlling the flow of fluid from the pump to cause the piston to be moved back and forth within the cylinder.

5. In a railway vehicle, in combination, a driven wheel axle, a motor for driving the wheel axle and means other than the driving motor for oscillating the vehicle during the starting period.

6. An electric locomotive comprising wheel axles, a frame mounted on the wheel axles, a driving motor for propelling the locomotive, a draw-bar mechanism for connecting the locomotive to a train and means for oscillating the locomotive relative to the train during the starting period to cause the driving motor to turn slowly, thereby avoiding heat concentration in any portion of the motor.

7. In an electric locomotive, in combination, a draw-bar, hydraulic means for moving the locomotive relative to the draw-bar in the longitudinal direction and control means for automatically reversing the direction of motion of the locomotive.

8. A railway vehicle comprising wheel axles, a frame mounted on the wheel axles, a motor for driving the vehicle, said motor being operatively connected to a wheel axle, a draw-bar mechanism and means for oscillating the draw-bar in the longitudinal direction of the locomotive.

9. An electric locomotive comprising a frame, wheel axles for supporting the frame, a motor for propelling the locomotive, said motor being provided with a commutator cylinder and brushes, a gear train for connecting the motor to a wheel axle, a draw-bar mechanism, and means for moving the locomotive longitudinally relative to the draw-bar in order that the commutator cylinder may be moved relative to the brushes while the load to which the locomotive is attached is stationary.

10. An electric locomotive comprising a frame, wheel axles for supporting the frame, a motor for propelling the locomotive, said motor being provided with a commutator cylinder and brushes, a gear train for connecting the motor to a wheel axle, a draw-bar mechanism, and means for moving the locomotive backward and forward a short distance relative to the draw-bar at a substantially constant speed to cause the commutator cylinder to oscillate slowly relative to the brushes for the purpose of distributing the load on the commutator during the starting period.

11. A draw-bar mechanism for an electric locomotive comprising a standard draw-bar, a piston operatively connected thereto, a cylinder secured to the locomotive for receiving the piston and fluid pressure means for acting upon the piston to oscillate the locomotive relative to the draw-bar.

12. In an electrical locomotive, in combination, a draw-bar system for haulage purposes, a motor provided with a commutator cylinder and brushes disposed to engage the commutator cylinder, and means for effecting relative movement of the commutator cylinder and brushes during the application of a tractive effort by the locomotive to the draw-bar system while the draw-bar system is stationary to distribute the heating of the commutator cylinder.

13. In an electrical locomotive, in combination, a draw-bar system for haulage purposes, a motor provided with a commutator cylinder and brushes disposed to engage the commutator cylinder, and means independent of the motor for effecting relative movement of the commutator cylinder and brushes to distribute the heating of the commutator cylinder during the application of a tractive effort by the locomotive to the draw-bar system while the draw-bar system is stationary.

14. In an electrical locomotive, in combination, a draw-bar system for haulage purposes, a motor provided with a commutator cylinder and brushes disposed to engage the commutator cylinder, and means for oscillating the commutator cylinder relative to the brushes during the application of a tractive effort by the locomotive to the draw-bar system while the draw-bar system is stationary to distribute the heating of the commutator cylinder.

15. In an electrical locomotive, in combination, a draw-bar system for haulage purposes, a motor provided with a commutator cylinder and brushes disposed to engage the commutator cylinder, and means independent of the motor for oscillating the commutator cylinder relative to the brushes during the application of a tractive effort by the locomotive to the draw-bar system while the draw-bar system is stationary to distribute the heating of the commutator cylinder.

16. In an electrical locomotive, in combination, a draw-bar system for haulage purposes, a motor provided with a commutator cylinder and brushes disposed to engage the commutator cylinder, and means connected to the draw-bar system for effecting relative oscillatory movement of the commutator cylinder and brushes during the application of a tractive effort by the locomotive to the draw-bar system while the draw-bar system is stationary to distribute the heating of the commutator cylinder.

17. In an electrical locomotive, in combination, a draw-bar system for haulage purposes, a motor provided with a commutator cylinder and brushes disposed to engage the commutator cylinder, and means connected to the draw-bar system for effecting relative oscillatory movement of the commutator cylinder and brushes independently of the motor during the application of a tractive effort by the locomotive to the draw-bar system while the draw-bar system is stationary to distribute the heating of the commutator cylinder.

18. In an electrical locomotive, in combination, a draw-bar system for attaching the locomotive to a train, a driving motor for actuating the locomotive and means for moving the locomotive backward and forward relative to the train to which it is attached while the driving motor is exerting tractive effort continuously in one direction, whereby the motor is oscillated to distribute heating effects of the starting current.

19. In a railway vehicle, in combination, a draw-bar at each end thereof, a hydraulic cylinder associated with each draw-bar and means for interconnecting the hydraulic cylinders to effect simultaneous movement of the draw-bars.

20. A railway vehicle comprising a frame, hydraulic cylinders carried by the frame, pistons in the cylinders, draw-bar mechanism connected to the pistons and extending at each end of the vehicle frame and means for interconnecting the cylinders in such manner that movement of one draw-bar relative to the frame will cause simultaneous movement of the other draw-bar in the same direction.

In testimony whereof, I have hereunto subscribed my name this 12th day of May, 1928.

CHARLES C. WHITTAKER.